Patented Aug. 7, 1934

1,969,189

UNITED STATES PATENT OFFICE

1,969,189

SULPHONATION OF BETA-NAPHTHYLAMINE

John M. Tinker, South Milwaukee, and Vernon A. Hansen, Milwaukee, Wis., assignors to E. I. du Pont de Nemours & Company, Wilmington, Del., a corporation of Delaware No Drawing. Application March 4, 1932, Serial No. 596,896

9 Claims. (Cl. 260—129)

This invention relates to a process of sulphonating beta-naphthylamine. More particularly, this invention deals with a process of preparing 2-naphthylamine-1-sulphonic acid by reacting with sulphur trioxide upon beta-naphthylamine dissolved in an inert organic solvent, and has for its object the improvement of said process whereby the desired product is obtained in higher yield and in greater purity than by hitherto known methods. Other and further important objects of this invention will appear as the description proceeds.

In U. S. Patent No. 1,794,861, by Murphy and Oesch, is described a process for preparing 2-naphthylamine-1-sulphonic acid by reacting with sulphur trioxide upon beta-naphthylamine dissolved in a dry inert organic solvent, such as tetrachlorethane. As a specific example therein of the preferred mode of operation, it was suggested to carry out the process at two stages of temperature. During the first stage the temperature is maintained at about 18° C. for about 12 hours. The reaction mass is then heated to reflux and stirred at reflux temperature for about 2 hours. It seems that during the first stage of reaction, the $SO_3$ enters the amino group of the base, forming an addition compound involving 1 mole of beta-naphthylamine and 1 mole of $SO_3$. During the second stage an intramolecular rearrangement takes place, whereby the $SO_3$ group leaves the amino group and attaches itself to the nucleus in ortho position to the amino group.

Now, since tetrachlorethane boils at 147° C., said disclosure implies that the preferred temperature for the second stage of this reaction is at about 140–150° C.

We have now found that when the sulphonation of beta-naphthylamine is carried out substantially as described in said U. S. Patent No. 1,794,861, but with this modification,—that the second stage is carried out at a considerably lower temperature,—the yield of 2-naphthylamine-1-sulphonic acid is substantially increased and brought near its theoretical maximum. More particularly, we found that if the second stage of the reaction is carried out at the reflux temperature of the mixture, sulphonation does take place to practically theoretical extent; the product, however, contains a high percentage of isomers, from which the desired product, namely 2-naphthylamine-1-sulphonic acid, is separable only with great difficulty. If the second stage, however, is carried out at lower temperatures, say at about 90° C., the product is substantially pure 2-naphthylamine-1-sulphonic acid in a yield of over 90% theory.

The above effect was not to be forseen. For although it might have been expected that variation in temperature would affect the quality and quantity of the product, there was no reason to expect that the variation would be favorable to the yield, and that it would increase the latter to such a high degree. Nor was it to be anticipated that the optimum temperature would be so far below the boiling point.

Some variation is permissible in the preferred temperature above indicated, but for best results it should not vary outside the range of, say, 80–100° C. Below 80° C., the reaction takes a very long time, or else there remains some of the initial addition product unconverted to the sulphonic acid, and the yield is accordingly decreased. Above 100° C. the sulphonation is complete, but the product contains considerable quantities of isomers, which not only reduce the quantity of the desired main product but also make the isolation thereof difficult.

We have also found that the temperature of the first stage need not be limited to 18° C. as indicated in U. S. Patent No. 1,794,861. Practically any convenient temperature may be used, provided it is not greater than the optimum temperature for the second stage, to wit, 90° C.

The quantity of $SO_3$ introduced into the reaction mass should preferably be carefully regulated so as to be as near theoretical as possible (1 mole of $SO_3$:1 mole of naphthylamine). While variations within 5% either way are tolerable, their effect on the product is nevertheless noticeable. If an excess of $SO_3$ is used, disulphonic acid compounds begin to be formed. If a deficiency is employed, part of the amine remains unsulphonated. In any event, it is better to work with a deficiency of $SO_3$ than with an excess, since it is easier to separate the desired main product (2-naphthylamine-1-sulphonic acid) from the unconverted base than from any isomers or higher sulphonation derivatives formed therewith.

Without limiting our invention to any particular procedure the following example is given to illustrate our preferred mode of operation. Parts given are parts by weight.

Example 286 parts of dry beta-naphthylamine are dissolved in 3000 parts of dry tetrachlorethane. 160 parts of sulphur trioxide (free from sulphuric acid) are now slowly passed in at 25–35° C. The $SO_3$ vapors are best obtained by bubbling dry air through oleum and conducting the vapors through a scrubber to entrap the mist of sulphuric acid. When the sulphur trioxide has all been added, the mass turns into a thin, sticky paste, almost white in color.

The mass is now stirred vigorously for 3 hours longer at room temperature, then raised slowly to 90–95° C., and further stirred at this temperature for about 5 hours. The finished sulphonation mass is then mixed with 2500 parts of water and made slightly alkaline with 200 parts of soda ash. The 2-naphthylamine-1-sulphonic acid formed dissolves in the aqueous layer, and the tetrachlorethane is removed by decantation. The aqueous layer contains a substantially quantitative yield of naphthylamine sulphonic acids. This solution is of sufficient purity to be applicable directly for most technicl purposes. If it is desired to recover the acid in solid form, this solution may be acidified, and the precipitated acids filtered off.

If a product of higher purity is desired, the recovery from the above solution should be best effected by salting out. For this purpose, 720 grams of common salt are added and the mass cooled to 10–15° C. The sodium salt of 2-naphthylamine-1-sulphonic acid crystallizes out and can be separated by filtration. The filter cake is dissolved in 2000 parts of water and the solution is made acid to Congo with 230 parts of hydrochloric acid. The mass is then filtered, and the filter cake is dried. 402 parts of pure 2-naphthylamine-1-sulphonic acid (90% of theory) are thus obtained.

The tetrachlorethane layer may be recovered by steam distillation, and after drying is suitable for reuse.

It will be understood that many variations and modifications are possible in our preferred procedure without departing from the spirit of this invention.

We claim:

1. The process of preparing 2-naphthylamine-1-sulphonic acid which comprises passing sulphur trioxide in a quantity not exceeding equimolecular proportion into a solution of beta-naphthylamine in a dry inert organic solvent at a temperature not exceeding 90° C. and finishing the reaction by heating the mass to a temperature not exceeding 100° C.

2. The process of preparing 2-naphthylamine-1-sulphonic acid which comprises passing sulphur trioxide in a quantity not exceeding equimolecular proportion into a solution of beta-naphthylamine in a dry inert organic solvent at a temperature not exceeding 90° C. and finishing the reaction by heating the mass to a temperature between 80 and 100° C.

3. The process of preparing 2-naphthylamine-1-sulphonic acid which comprises passing sulphur trioxide in substantially molal ratio into a solution of beta-naphthylamine in tetra-chlorethane at a temperature not exceeding 90° C. and finishing the reaction by heating the mass to a temperature not exceeding 100° C.

4. The process of preparing 2-naphthylamine-1-sulphonic acid which comprises passing sulphur trioxide in substantially molal ratio into a solution of beta-naphthylamine in tetra-chlorethane at a temperature not exceeding 90° C. and finishing the reaction by heating the mass to a temperature between 80 and 100° C.

5. The process of preparing 2-naphthylamine-1-sulphonic acid which comprises passing sulphur trioxide in substantially molal ratio into a solution of beta-naphthylamine in tetrachlorethane at a temperature not exceeding 90° C. and finishing the reaction by heating the mass to about 90 to about 95° C.

6. The process of preparing 2-naphthylamine-1-sulphonic acid which comprises passing sulphur trioxide in substantially molal ratio into a solution of beta-naphthylamine in tetrachlorethane at a temperature not exceeding 90° C. and heating the mass to about 90 to about 95° C. for several hours to convert the initially formed intermediate addition product into 2-naphthylamine-1-sulphonic acid.

7. In a two stage process for preparing 2-naphthylamine-1-sulphonic acid which comprises first forming an intermediate addition product involving beta-naphthylamine and sulphur trioxide and then heating to rearrange the intermediate addition product into 2-naphthylamine-1-sulphonic acid, the improvement which comprises carrying out the second stage of this reaction at a temperature of about 90 to about 95° C.

8. In a process for preparing 2-naphthylamine-1-sulphonic acid by passing sulphur trioxide gas in substantially molal ratio into a solution of beta-naphthylamine in tetrachlorethane and heating, the improvement which comprises effecting the heating at a temperature of about 90 to about 95° C.

9. The process of preparing 2-naphthylamine-1-sulphonic acid in the form of a salt thereof and in a high state of purity, which comprises dissolving substantially 286 parts of beta-naphthylamine in 3000 parts of dry tetrachlorethane; passing into this solution 160 parts of sulphur trioxide gas; heating the mass at about 90 to about 95° C. for a period of about 5 hours, neutralizing the reaction mass with dilute aqueous alkali; separating the aqueous layer from the tetrachlorethane layer, and salting out the alkali salt of 2-naphthylamine-1-sulphonic acid.

JOHN M. TINKER.
VERNON A. HANSEN.